(12) United States Patent
Noda et al.

(10) Patent No.: US 8,517,671 B2
(45) Date of Patent: Aug. 27, 2013

(54) WIND TURBINE GENERATOR

(75) Inventors: Yoshitomo Noda, Tokyo (JP); Seita Seki, Tokyo (JP); Akihiko Yano, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 73 days.

(21) Appl. No.: 13/218,963

(22) Filed: Aug. 26, 2011

(65) Prior Publication Data

US 2012/0009063 A1    Jan. 12, 2012

Related U.S. Application Data

(63) Continuation of application No. PCT/JP2011/064254, filed on Jun. 22, 2011.

(30) Foreign Application Priority Data

Jun. 28, 2010 (JP) .................................. 2010-146388

(51) Int. Cl.
*F03D 11/04* (2006.01)

(52) U.S. Cl.
USPC ....................................... 415/123; 415/124.1

(58) Field of Classification Search
USPC ..... 415/122.1, 123, 124.1, 124.2; 416/169 A
See application file for complete search history.

(56) References Cited

U.S. PATENT DOCUMENTS

| | | | | |
|---|---|---|---|---|
| 3,212,296 A | * | 10/1965 | Benjamen | 464/8 |
| 4,575,310 A | * | 3/1986 | Otani | 416/134 R |
| 5,232,072 A | * | 8/1993 | Pluta | 188/72.7 |
| 7,762,771 B2 | * | 7/2010 | Nies | 416/43 |

FOREIGN PATENT DOCUMENTS

| | | |
|---|---|---|
| EP | 0945613 | 9/1999 |
| JP | 2002-068070 | 3/2002 |
| JP | 2004-122828 | 4/2004 |
| JP | 2005-233055 | 9/2005 |
| JP | 2005-320891 | 11/2005 |
| JP | 2005-337267 | 12/2005 |
| JP | 2005-337333 | 12/2005 |
| JP | 2007-132207 | 5/2007 |

\* cited by examiner

*Primary Examiner* — Edward Look
*Assistant Examiner* — Aaron R Eastman
(74) *Attorney, Agent, or Firm* — Manabu Kanesaka; Kenneth M. Berner; Benjamin J. Hauptman

(57) ABSTRACT

Provided is a wind turbine generator in which, the specifications of the gears can be designed for the level of a maximum load during driving without decreasing the necessary strength and durability. A wind turbine generator in which a nacelle is installed at an upper end of a tower that is vertically erected on a foundation includes a yaw driving unit that yaws the nacelle and/or a pitch driving unit that controls pitch angles of the wind turbine blades, wherein a drive mechanism of the yaw driving unit and/or the pitch driving unit, which are equipped with an engaging portion of a slewing bearing (20) having internal teeth or external teeth and a pinion gear is equipped with a clutch mechanism, at the engaging portion, that slides when receiving an input larger than a maximum load during driving.

3 Claims, 8 Drawing Sheets

WIND TURBINE GENERATOR

CROSS-REFERENCE TO RELATED APPLICATIONS

This is a continuation of International Application PCT/JP2011/64254, with an international filing date of Jun. 22, 2011, which is hereby incorporated by reference herein in its entirety. This application claims the benefit of Japanese Patent Application No. 2010-146388, the content of which is incorporated herein by reference.

TECHNICAL FIELD

The present invention relates to a wind turbine generator in which a yaw driving unit of a nacelle and a pitch driving unit of wind turbine blades are equipped with a slewing bearing of a rolling bearing type.

BACKGROUND ART

A wind turbine generator 1 (hereinafter also referred to as "wind turbine"), for example, as shown in FIGS. 7 to 9, is an apparatus that generates electric power with a generator that is driven in such a manner that a rotor head 4 equipped with wind turbine blades 5 rotates when receiving wind power and increases the rotational speed using a gearbox.

In such a wind turbine generator 1, since the rotor head 4 equipped with the wind turbine blades 5 is joined to a gearbox and a generator in a nacelle 3 installed on the top of a tower 2 via a main shaft, for example, an up-wind wind turbine generator 1 needs to receive the wind from the front of the rotor head 4 by yawing (turning on a substantially horizontal plane) the nacelle 3 on the tower 2 to point the rotor head 4 in a fluctuating wind direction (to make the rotational plane of the rotor face the wind direction).

FIGS. 8A and 8B show a configuration example of a yaw driving unit 10 for yawing the nacelle 3. The yaw driving unit 10 is a yaw control system for yawing the large nacelle 3 using the driving force of a yaw motor 11 so that the rotational plane of the rotor follows the wind direction to face it.

Reference sign 2 in the drawing denotes a tower, 3 denotes a nacelle, 3a denotes a nacelle base plate, 12 denotes a drive gear (pinion gear), 13 denotes a fixed gear, 14 denotes a yaw slewing bearing (rolling bearing), and 15 denotes a yaw braking system.

Specifically, in the configuration example in FIGS. 8A and 8B, the rolling bearing serving as the yaw slewing bearing 14 is configured such that rolling elements 14c are held between an outer ring 14a and an inner ring 14b, and a fixed gear 13 is formed around the outer diameter (outer circumferential surface) of the outer ring 14a, which is fixed to the tower 2. The inner ring 14b is fixed to the nacelle base plate 3a.

On the other hand, because the drive gear 12 that engages with the fixed gear 13 is rotated by the yaw motor 11, which is securely fixed to the nacelle base plate 3a, the nacelle 3 turns together with the drive gear 12 that orbits around the outer circumference of the fixed gear 13 while rotating on its axis.

The above-described yaw slewing bearing 14 may have a configuration in which the fixed gear 13 is formed around the inner diameter (inner circumferential surface), with the inner ring 14b serving as a fixed side, so that the drive gear 12 orbits around the inner circumference of the fixed gear 13 while rotating on its axis.

The wind turbine blades 5 are each provided with a pitch driving unit 16 to vary the pitch angles of the wind turbine blades 5, as shown in FIG. 9. In the pitch driving units 16, the wind turbine blades 5 are each supported via a blade slewing bearing (rolling bearing) 17 so that they can turn relative to the rotor head 4.

Conventional pitch driving units are provided with some play so that the pinion gear can slightly move in the axial direction to prevent the teeth from being broken due to partial contact between the teeth of the blade slewing gear and the teeth of the pinion gear. (For example, refer to Patent Literature 1)

CITATION LIST

Patent Literature

{PTL 1} The Publication of Japanese Patent No. 4364008

SUMMARY OF INVENTION

Technical Problem

As described above, the yaw slewing bearing 14 and the blade slewing bearing 17 adopt a configuration employing rolling bearings having the fixed gear 13 around the inner circumference or the outer circumference (including a structure in which another gear is mounted), and the nacelle 3 and the wind turbine blades 5 are turned by engaging the drive gear 12 and the fixed gear 13.

The yaw slewing bearing 14 and the blade slewing bearing 17 having gears formed thereon require a huge cost because they need a large crane when performing repair and replacement works. Accordingly, the teeth of the yaw slewing bearing 14 and the blade slewing bearing 17 require particularly high reliability and durability.

On the other hand, along with the tendency for wind turbine generators 1 to increase in size, weight reduction of an upper structure (nacelle 3 etc.) in order to reduce the load on the tower 2 has become a big challenge.

In such a turn drive mechanism using gears, the specifications of the gears used depend on the impact load or fatigue load (load+rotational speed). The impact load in this case is caused by a wind load that acts on the wind turbine blades 5, such as a gust of wind. In particular, if the gears cannot withstand the impact load, the teeth will be broken, becoming unusable, which will cause the wind turbine generator 1 to become uncontrollable, and thus, the specifications of the gears are often determined according to the impact load.

For the fatigue load, although flaking or wear occurs on the metal surface of the gears, the wind turbine generator 1 does not become suddenly uncontrollable.

Appropriately relieving the impact load allows the specifications of the gears to be relaxed to decrease the weight. In this case, the gears of the yaw driving unit 10 need to have specifications that can withstand the maximum load during driving that is applied to the gears by operating the yaw driving unit 10 when electric power is to be generated by driving the rotor head 4.

In this case, the magnitude relationship among the impact load, the maximum load during driving, and the fatigue load is "impact load>maximum load during driving>fatigue load".

The present invention is made to solve the above problems, and an object thereof is to provide a wind turbine generator in which, in the case where a rolling bearing equipped with a fixed gear formed around the inner circumference or the outer circumference thereof is used as a yaw slewing bearing and a blade slewing bearing and is engaged with a drive gear, the specifications of the gears can be designed for the level of a maximum load during driving without decreasing necessary strength and durability.

Solution to Problem

The present invention adopts the following solutions to solve the above problems.

A wind turbine generator according to an aspect of the present invention is a wind turbine generator that generates electric power in such a manner that a rotor head that rotates when receiving wind power at wind turbine blades drives a generator installed inside a nacelle, the nacelle being installed at an upper end of a tower that is vertically erected on a foundation, the wind turbine generator comprising: a yaw driving unit that yaws the nacelle and/or a pitch driving unit that controls pitch angles of the wind turbine blades, wherein a drive mechanism of the yaw driving unit and/or the pitch driving unit, which are equipped with an engaging portion of a slewing bearing having internal teeth or external teeth and a pinion gear, is equipped with a clutch mechanism, at the engaging portion, that slides when receiving an input larger than a maximum load during driving.

The wind turbine generator according to the aspect of the present invention is equipped with a yaw driving unit that yaws the nacelle and/or a pitch driving unit that controls the pitch angles of the wind turbine blades, and a drive mechanism of the yaw driving unit and the pitch driving unit, which are equipped with an engaging portion of a slewing bearing having internal teeth or external teeth and a pinion gear, is equipped with a clutch mechanism, at the engaging portion, that slides when receiving an input larger than a maximum load during driving; therefore, if receiving a load input larger than the maximum load during driving, such as an impact load, the clutch mechanism can absorb the excessive load input by operating to slide. Accordingly, in defining the specifications of the gears of the engaging portion, the upper limit of the load acting on the engaging portion can be specified as the maximum load during driving at which the clutch mechanism operates.

In a wind turbine generator according to the aspect of the present invention, preferably, the clutch mechanism is configured such that a frictional force generated between contact surfaces that divide an inner ring or an outer ring serving as a fixed side of the slewing bearing in the radial direction is specified as a desired sliding starting preset load. Thus, if an excessive load larger than the starting preset load that is substantially equal to the maximum load during driving is input, the inner ring or the outer ring at the fixed side overcomes a frictional force generated between the contact surfaces that divide the inner ring or the outer ring to slide (run idle), thus allowing the excessive load input that acts on the engaging portion to be absorbed.

Preferably, a wind turbine generator with such a configuration further includes a pressing-force adjusting mechanism that pushes horizontal surfaces and/or inclined surfaces provided on the contact surfaces in a vertical direction. This facilitates the setting and adjustment of a starting preset load substantially equal to the maximum load during driving.

In a wind turbine generator according to the aspect of the present invention, preferably, the clutch mechanism is configured such that a joint between a pinion gear main body and a pinion shaft of the pinion gear has a tight-fitting structure, and a sliding starting preset load is specified. Thus, if an excessive load larger than the starting preset load substantially equal to the maximum load during driving is input, the pinion main body and the pinion shaft with the tight-fitting structure slide and run idle, and thus, the excessive load input that acts on the engaging portion can be absorbed.

In a wind turbine generator with such a configuration, preferably, the tight-fitting structure of the joint is configured such that a shaft insertion hole in the pinion gear main body and an inserted portion of the pinion shaft are tapered surfaces, and the sliding starting preset load is specified in accordance with a compressing force of the tapered surfaces, adjusted with a bolt tightening amount. This facilitates the setting and adjustment of a starting preset load substantially equal to the maximum load during driving.

Advantageous Effects of Invention

Since the wind turbine generator of the present invention described above is equipped with a fixed gear formed around the inner circumference or outer circumference, and a rolling bearing for use as a yaw slewing bearing and a blade slewing bearing is provided with a clutch mechanism, at the engaging portion, that slides when receiving an input larger than the maximum load during driving, an excessive impact load that acts on the gears of the engaging portion can be released by the operation of the clutch mechanism. Accordingly, the specifications of the gears of the engaging portion of the rolling bearing for use as the yaw slewing bearing and the blade slewing bearing can be designed for the level of a maximum load during driving without reducing necessary strength and durability.

In other words, since the wind turbine generator of the present invention is provided with the clutch mechanism that operates to slide when an excessive load larger than a predetermined value acts, the specifications of the gears of the engaging portion can be designed for the level of a maximum load during driving by releasing an excessive impact load that acts on the engaging portion of the yaw slewing bearing and the turbine slewing bearing. This offers the notable advantage of contributing to decreasing the weight of the superstructure, such as a nacelle, mounted at the upper end of the tower by reducing the size and weight of the gears of the engaging portion.

DESCRIPTION OF EMBODIMENTS

An embodiment of a wind turbine generator according to the present invention will be described hereinbelow on the basis of the drawings.

Figure 7:
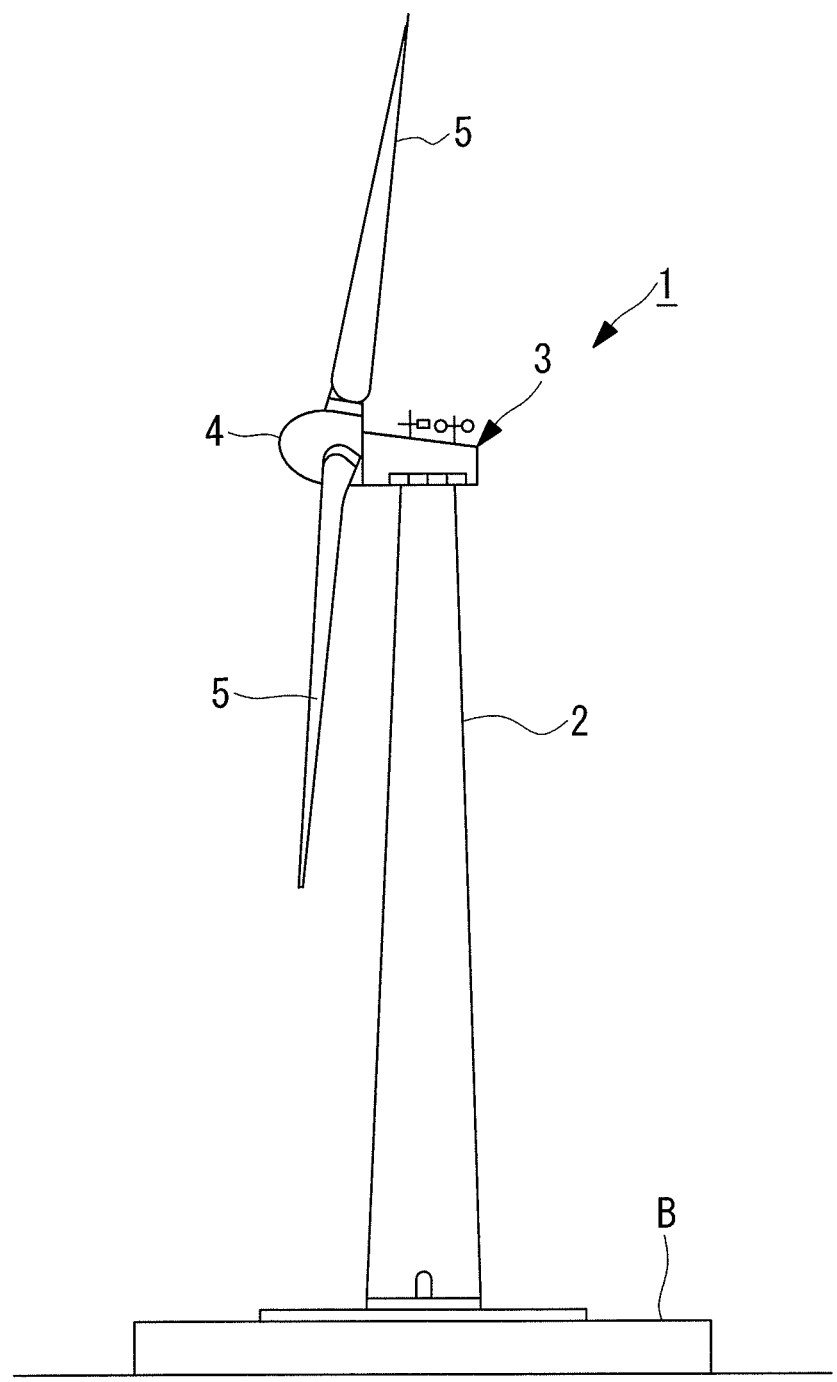
FIG. 7 is a side view showing, in outline, the wind turbine generator.

As shown in FIG. 7, for example, a wind turbine generator 1 includes a wind turbine tower (hereinafter referred to as "tower") 2 vertically erected on a foundation B, a nacelle 3 mounted on the upper end of the tower 2, and a rotor head 4 provided at the front end of the nacelle 3 so as to be supported rotatably about the substantially horizontal lateral rotation axis.

The rotor head 4 has a plurality of (for example, three) wind turbine blades 5 mounted radially about the rotation axis thereof, and the pitch angles of the individual wind turbine blades 5 can be adjusted in accordance with the wind conditions. Thus, the force of wind blowing against the wind turbine blades 5 from the direction of the rotation axis of the rotor head 4 is converted to motive power that rotates the rotor head 4 about the rotation axis.

A door for coming in and out of the tower is provided in the vicinity of the lower end of the tower 2, and an anemometer for measuring the wind speed in the vicinity and an anemoscope for measuring the wind direction, etc. are disposed at appropriate locations of the outer peripheral surface (for example, at the upper part) of the nacelle 3.

In other words, the wind turbine generator 1 generates electric power in such a manner that the rotor head 4, which rotates about the substantially horizontal rotation axis when receiving wind power with the wind turbine blades 5, drives a generator (not shown) installed in the nacelle 3, and the nacelle 3 is mounted on the upper end of the tower 2, which is vertically erected on the reinforced concrete foundation B, in a manner allowing yawing.

First Embodiment

A configuration example of a clutch mechanism at a fixed gear side of an engaging portion provided at a drive mechanism of a yaw driving unit and a pitch driving unit will be described in detail hereinbelow with reference to FIGS. 1A and 1B as a first embodiment of a wind turbine generator according to the present invention.

Figure 8A:
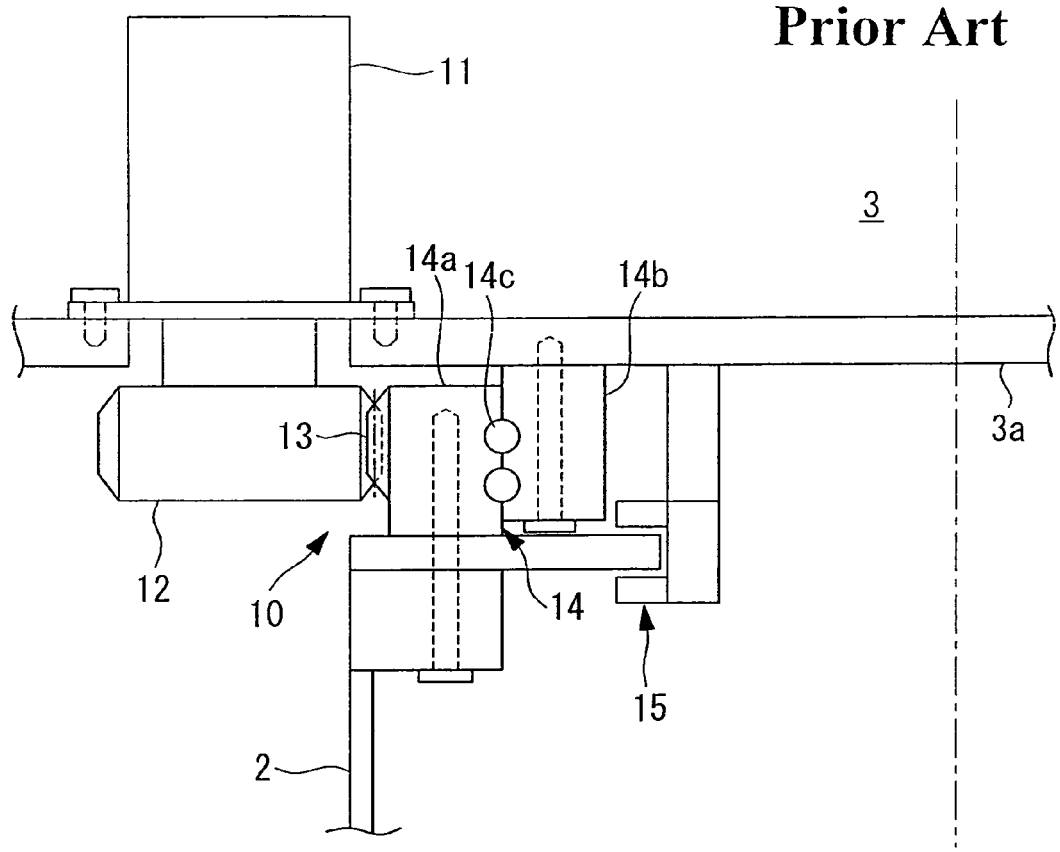
FIG. 8A is a sectional view showing a configuration example of a conventional yaw driving unit.
Figure 8B:
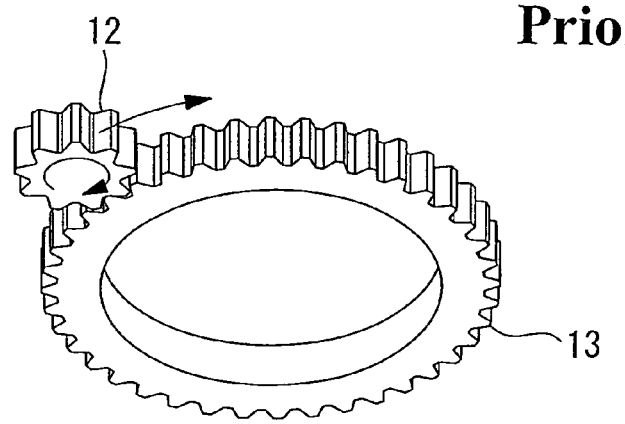
FIG. 8B is a diagram showing a configuration example of the conventional yaw driving unit, which is a perspective view showing the operation of a drive gear (pinion gear) relative to a fixed gear.
Figure 9:
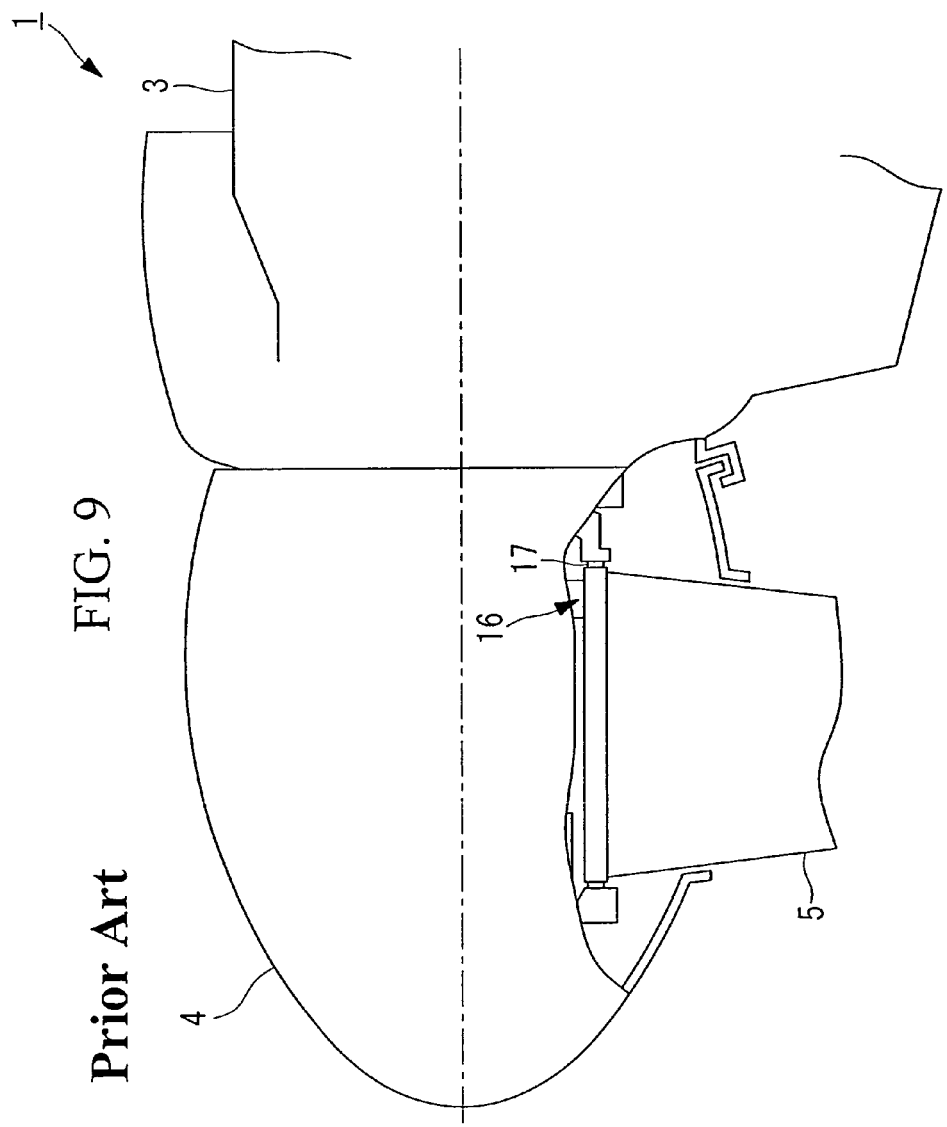
FIG. 9 is a sectional view of a relevant part of a rotor head, showing a slewing bearing (rolling bearing) used in a conventional pitch driving unit.

As shown in FIGS. 8A to 9, the wind turbine generator 1 described above is equipped with the yaw slewing bearing 14 of the yaw driving unit 10 for yawing the nacelle 3 and/or the blade slewing bearing 17 of the pitch driving unit 16 for controlling the pitch angles of the wind turbine blades 5. In the wind turbine generator 1 of the present invention, the yaw slewing bearing 14 and the blade slewing bearing 17 both adopt a slewing bearing 20, which is a rolling bearing, configured as shown in FIG. 1A, for example. In the following embodiment, although a description is given of a case where the slewing bearing 20 is applied to the yaw driving unit 10, that is, where it is used as the yaw slewing bearing 14, the slewing bearing 20 of this embodiment can also be applied to the blade slewing bearing 17.

The slewing bearing 20 in the drawing is configured such that rolling elements 23 are held between an outer ring 21 and an inner ring 22, and the fixed gear 13 is provided around the outer diameter (outer circumferential surface) of the outer ring 21. The fixed gear 13 in this case may have teeth formed directly around the outer ring 21 or separate teeth attached thereon.

In the case where the slewing bearing 20 is used as the yaw slewing bearing 14 shown in FIG. 8A, the outer ring 21 is fixed to the tower 2, and the inner ring 22 is fixed to the nacelle base plate 3*a*. Accordingly, the fixed gear 13 is formed around the outer circumferential surface, that is, the outer diameter, of the outer ring 21, with which the pinion gear of the drive gear 12 fixed to the nacelle 3 side is engaged, whereby the slewing bearing 20 can be used as a component of the yaw driving unit 10 for yawing the nacelle 3.

In this embodiment, the drive mechanisms of the yaw driving unit 10 and the pitch driving unit 16 equipped with the engaging portion of the fixed gear 13 having external teeth and the drive gear 12 of the pinion gear formed at the slewing bearing 20 are each provided with a clutch mechanism, at the engaging portion, that slides when receiving an input larger than the maximum load during driving.

Figure 1A:
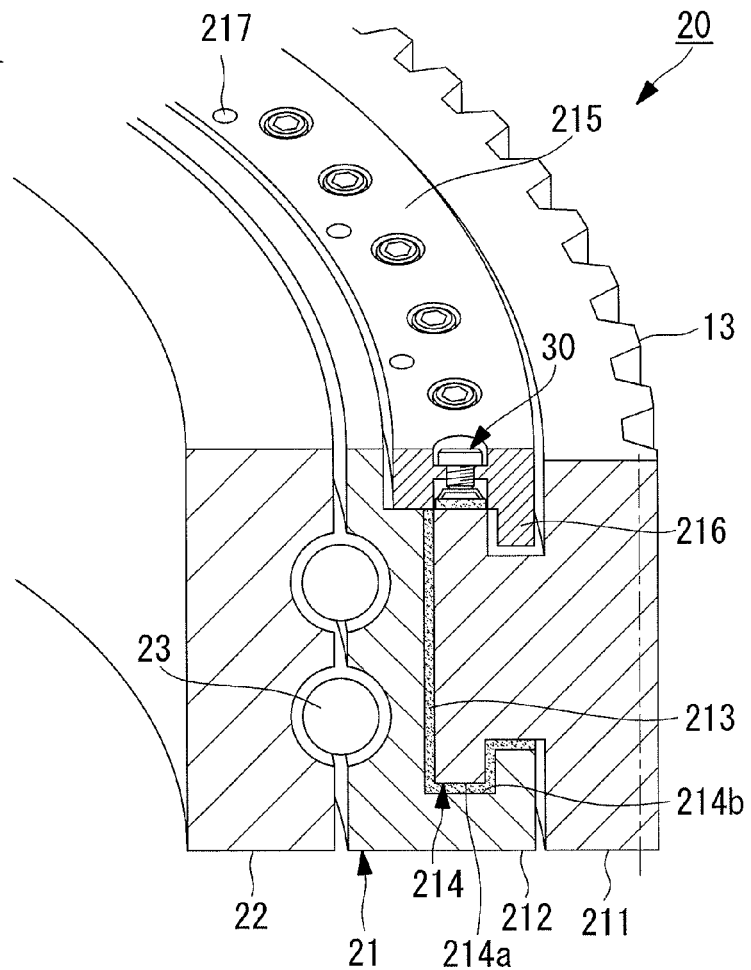
FIG. 1A is a diagram showing a first embodiment of a slewing bearing (rolling bearing) used in a wind turbine generator of the present invention, which is a longitudinal sectional view in which a fixed gear of the slewing bearing is provided with a clutch mechanism.

The clutch mechanism shown in FIG. 1A is configured such that the fixed side of the slewing bearing 20, that is, the immovable outer ring 21 fixed to the tower 2, is divided in the radial direction, and a frictional force generated between the contact surfaces of the divided components is specified as a desired sliding starting preset load. This starting preset load is the value of a load substantially equal to the maximum load during driving and is generally set to a load value slightly larger than the maximum load during driving.

In the configuration example of the clutch mechanism shown in FIG. 1A, the outer ring 21 is divided into two components, that is, a fixed-gear formed portion 211 at the outer circumference side and a rolling-element contact portion 212 at the inner circumference side that holds the rolling elements 23. A pad member 213 that increases the friction coefficient is held between the contact surfaces of the fixed-gear formed portion 211 and the rolling-element contact portion 212. The pad member 213 is suitably disposed in a partial or the entire area between the contact surfaces depending on conditions, such as a set load input value, which is a sliding starting preset load substantially equal to the maximum load during driving, and the friction coefficient of the pad member 213.

The pad member 213 is preferably a thin plate-like member used as, for example, a clutch plate of a clutch system or a brake pad of a brake system, in which a plastic or carbon material with a high friction coefficient is used.

Between the fixed-gear formed portion 211 and the rolling-element contact portion 212 is provided a securing portion 214 that prevents positional misalignment in the radial direction. The securing portion 214 is a level difference having a protrusion and a depression provided on the horizontal portions of the contact surfaces, in which a downward protruding portion 214*a* provided at the fixed-gear formed portion 211 at the outer circumference side is secured by a depressed portion 214*b* formed in the rolling-element contact portion 212 at the inner circumference side to prevent the fixed-gear formed portion 211 from being displaced from the rolling-element contact portion 212 to move toward the outer circumference in the radial direction.

Formation of the securing portion 214 is also effective in enlarging the contact surfaces that hold the pad member 213 and can thus also be used in adjusting the frictional force.

The fixed-gear formed portion 211 and the rolling-element contact portion 212 described above are provided with a fixed pressing member 215 that pushes the entire circumference from above, when the securing portion 214 is engaged. The fixed pressing member 215 is a substantially L-shaped cross-sectional member having a protruding portion 216 at a lower surface at the outer circumference and is fixed to the rolling-element contact portion 212 using a plurality of fixing bolts 217. In other words, the fixed-gear formed portion 211 and the rolling-element contact portion 212 are not mechanically joined together using a bolt or the like. However, they do not move relative to each other due to the frictional force of the pad member 213 held between the contact surfaces if an input acting on the fixed gear 13 is equal to or lower than the maximum load during driving, and thus, they function as the substantially integral outer ring 21.

Although the illustrated configuration example has a gap between the opposing surfaces of the fixed pressing member 215 and the rolling-element contact portion 212, the gap is not essential.

By providing such a clutch mechanism, in the engaging portion of the yaw driving unit 10 described above, when a load larger than the starting preset load substantially equal to the maximum load during driving of the yaw driving unit 10 is input from the drive gear 12 to the fixed gear 13, the clutch mechanism operates to be able to absorb the excessive input load that acts on the engaging portion. In other words, if an excessive input larger than the starting preset load, such as an impact load, acts on the engaging portion, a frictional force generated between the contact surfaces and that separates the fixed-side outer ring 21 is overcome, so that the fixed-gear formed portion 211 on which the fixed gear 13 is formed slides relative to the rolling-element contact portion 212.

As a result, the fixed gear 13 that has received the large load larger than the starting preset load runs idle together with the fixed-gear formed portion 211 and can thus absorb the excessive input load that acts on the engaging portion by means of this idling. Accordingly, since this can prevent the wind turbine generator 1 from becoming unusable due to damage to the drive gear 12 and the fixed gear 13 even if a load input larger than the maximum load during driving is exerted, the specifications of the gears may be designed with reference to the level of the maximum load during driving that acts at the start of operation of the yaw driving unit 10. The gears designed with reference to the level of the maximum load during driving can be reduced in size and weight as compared with the specifications of gears designed with reference to an impact load.

Figure 1B:
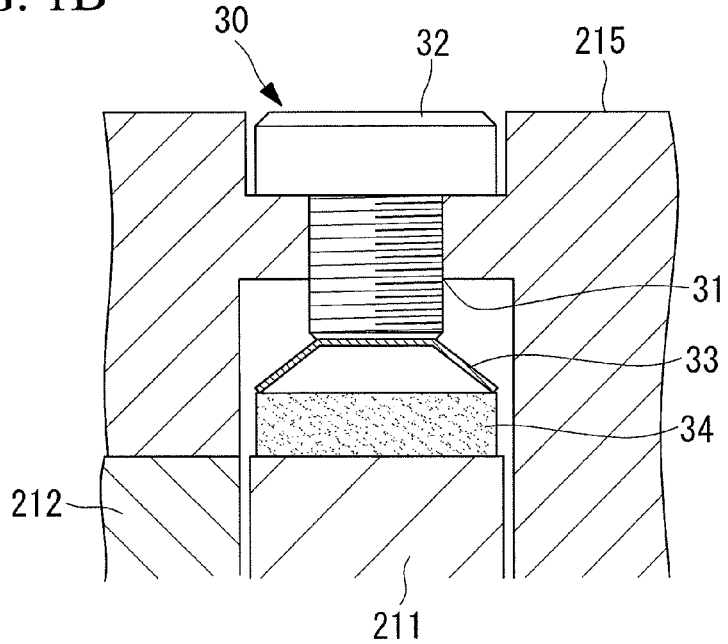
FIG. 1B is a diagram showing the first embodiment of the slewing bearing (rolling bearing) used in the wind turbine generator of the present invention, which is an enlarged view of a pressing-force adjusting mechanism in FIG. 1A.

Preferably, the foregoing wind turbine generator 1 is provided with a pressing-force adjusting mechanism 30 for the fixed pressing member 215, as shown in FIGS. 1A and 1B. The pressing-force adjusting mechanism 30 is a mechanism for adjusting the frictional force of the clutch mechanism by changing a pressing force acting in the vertical direction on the horizontal contact surface of the fixed-gear formed portion 211 that moves relatively due to the operation of the clutch mechanism.

The illustrated pressing-force adjusting mechanism 30 is configured such that the lower end of an adjusting bolt 32 that is screwed into a bolt hole 31 in the fixed pressing member 215 pushes the pressing member 34 with a high friction coefficient downward in the vertical direction via an elastic member 33 so that the horizontal contact surface of the fixed-gear formed portion 211 moves relatively, thereby generating a frictional force. The pressing-force adjusting mechanism 30 is disposed at a plurality of locations at an equal pitch in the circumferential direction of the fixed pressing member 215.

Since the thus-configured pressing-force adjusting mechanism 30 changes the amount of elastic deformation of the elastic member 33 in accordance with the amount of tightening of the adjusting bolt 32 into the bolt hole 31, the urging force of the elastic member 33 that acts on the pressing member 34 also changes. As a result, since a pushing force that pushes the pressing member 34 onto the contact surface of the fixed-gear formed portion 211 changes, the frictional force of the pressing member 34 that acts on the contact surface of the fixed-gear formed portion 211 which runs idle with respect to the fixed pressing member 215 at the fixed side when receiving an excessive load can easily be adjusted depending on the amount of tightening of the adjusting bolts 32.

The foregoing elastic member 33 is not particularly limited to, for example, a coil spring; however, a disc spring is preferable in consideration of maintaining a stable urging force, etc.

Figure 2:
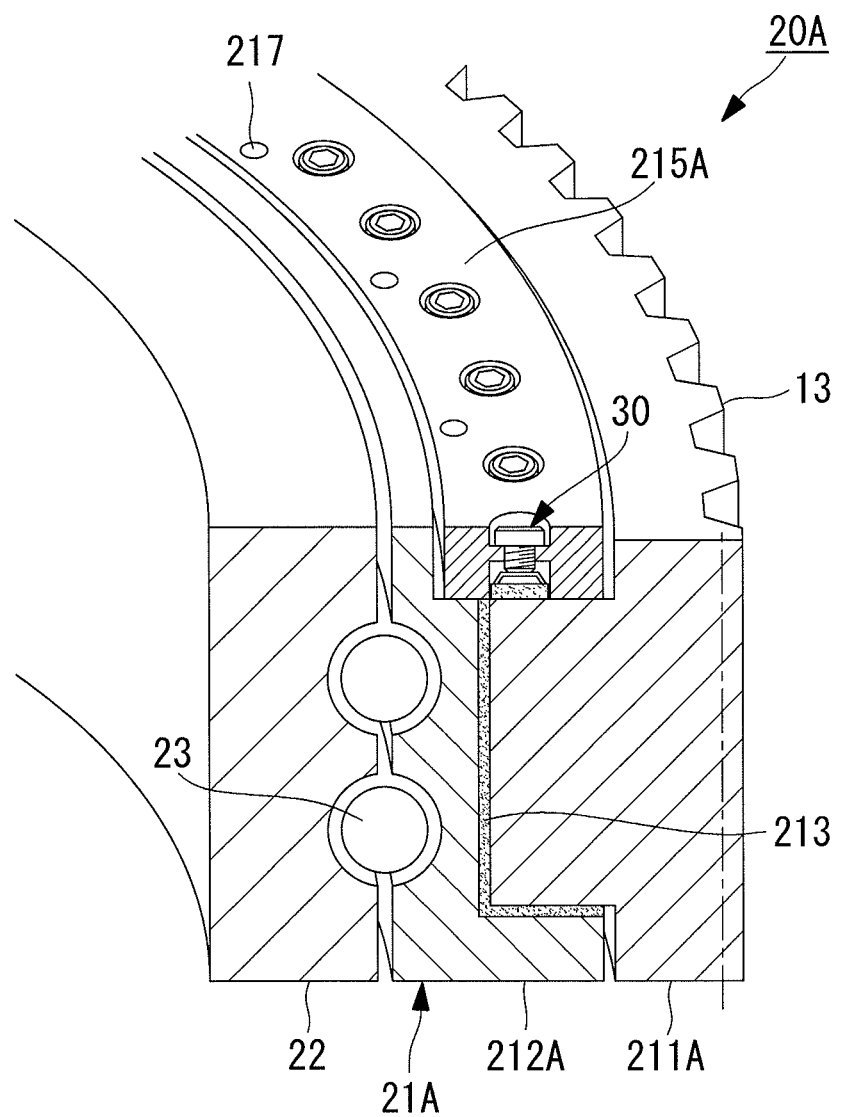
FIG. 2 is a longitudinal sectional view of a first modification of the slewing bearing (rolling bearing) shown in FIG. 1A.

Furthermore, as in a slewing bearing 20A of a first modification shown in FIG. 2, the securing portion 214 formed between a fixed-gear formed portion 211A and a rolling-element contact portion 212A may be omitted to simplify the structure. The structure of a fixed pressing member 215A in this case is simplified such that the protruding portion 216 protruding downward along the outer circumference is omitted to form a substantially rectangular cross section.

In the clutch mechanism of such a slewing bearing 20A, it is preferable that the pressing-force adjusting mechanism 30 be provided as necessary.

Figure 3:
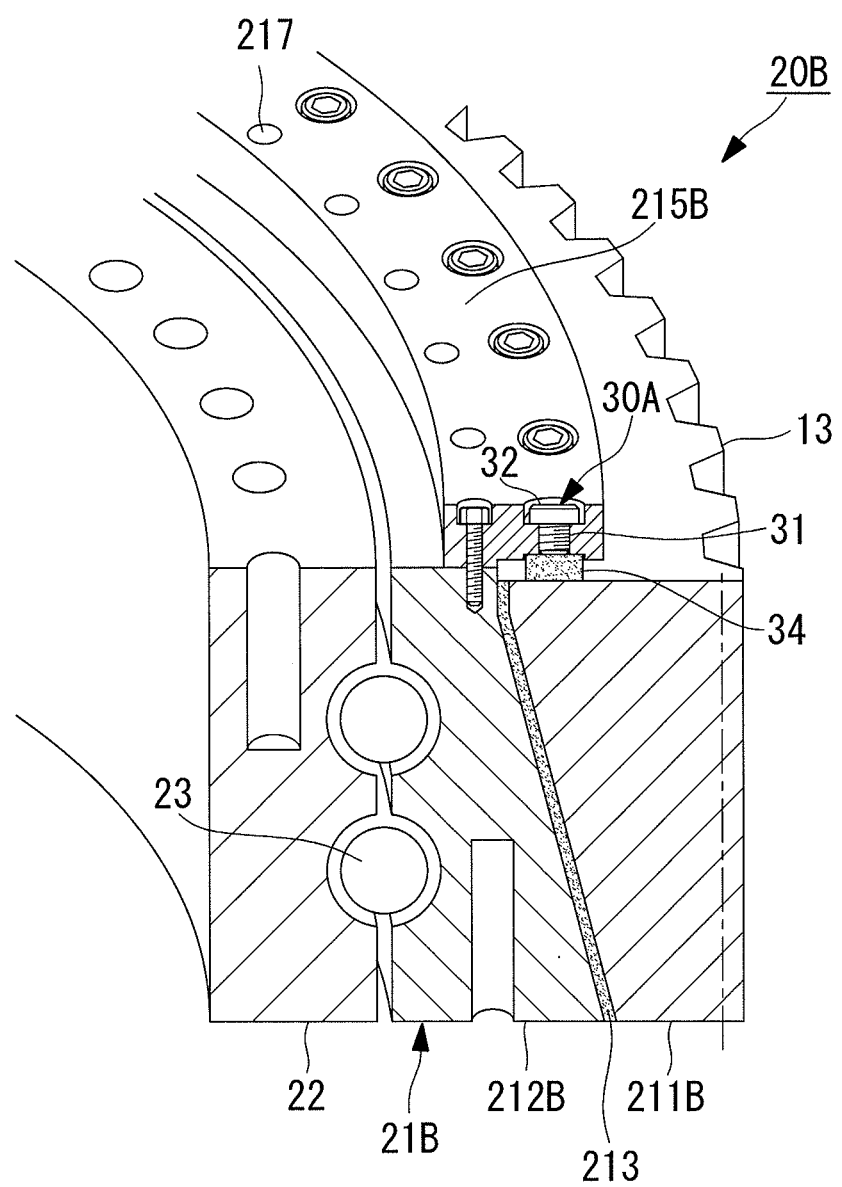
FIG. 3 is a longitudinal sectional view of a second modification of the slewing bearing (rolling bearing) shown in FIG. 1A.

A slewing bearing 20B of a second modification shown in FIG. 3 is configured such that contact surfaces formed between a fixed-gear formed portion 211B and a rolling-element contact portion 212B are increased in diameter downward to form inclined surfaces, between which the pad member 213 is held.

The clutch mechanism of such a slewing bearing 20B may also be provided with the foregoing pressing-force adjusting mechanism 30 as necessary, or alternatively, may be provided with a pressing-force adjusting mechanism 30A with a configuration in which the frictional force of the pressing member 34 is adjusted simply by the amount of tightening of the adjusting bolt 32, without the elastic member 33. Since the pressing-force adjusting mechanisms 30 and 30A in these cases adjust the frictional force by pushing the inclined surfaces of the contact surfaces formed between the fixed-gear formed portion 211B and the rolling-element contact portion 212B in the vertical direction, a starting preset load substantially equal to the maximum load during driving can easily be set and adjusted.

Second Embodiment

Figure 4:
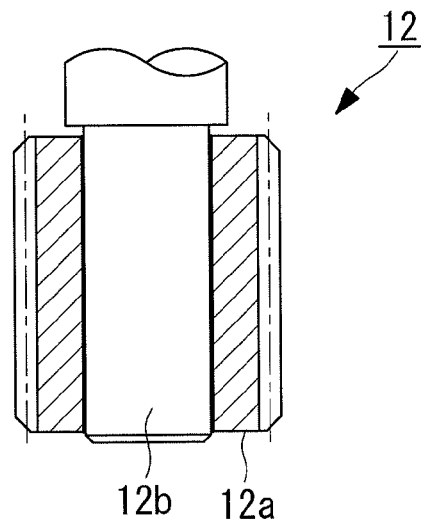
FIG. 4 is a diagram showing a second embodiment of a slewing bearing (rolling bearing) used in the wind turbine generator of the present invention, which is a longitudinal sectional view in which a drive gear of the slewing bearing is provided with a tight-fitting clutch mechanism.

Next, a configuration example of a clutch mechanism at a drive gear side of an engaging portion provided at a drive mechanism of a yaw driving unit and a pitch driving unit will be described in detail hereinbelow with reference to FIG. 4 as a second embodiment of a wind turbine generator according to the present invention.

The clutch mechanism of this embodiment is configured such that a joint between a pinion gear main body 12*a* and a pinion shaft 12*b* of a pinion gear used as the drive gear 12 has a tight-fitting structure, and a sliding starting preset load is specified depending on the frictional force of a tight-fitted portion serving as a sliding surface.

Figure 6A:
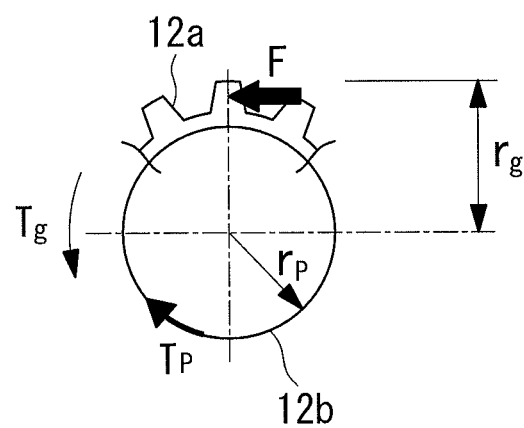
FIG. 6A is an explanatory diagram of the tight-fitting clutch mechanism, which is a cross-sectional view of a drive gear.
Figure 6B:
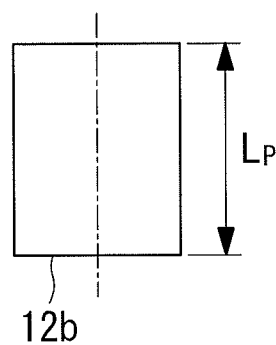
FIG. 6B is an explanatory diagram of the tight-fitting clutch mechanism, which is a side view of a shaft.

As shown in FIGS. 6A and 6B, the frictional force $F_p$ of the tight-fitting structure is expressed as "$F_p = \mu \times P \times A$", where A is the area of the tight-fitted portion, P is a surface pressure due to tight-fitting, and $\mu$ is the friction coefficient of the tight-fitted portion. The area A of the tight-fitted portion serving as a sliding surface is expressed as "$A = 2\pi \times r_p \times L_p$", where $L_p$ is the length of the pinion shaft 12b that is tight-fitted to the pinion gear main body 12a and $r_p$ is the radius of the cylindrical pinion shaft 12b.

On the other hand, a torque $T_g$ ($T_g = F \times r_g$) due to an impact load acts on the drive gear 12, where F is an impact load that acts on the drive gear 12, and $r_g$ is a position in the radial direction on which the impact load F acts.

Accordingly, controlling the torque $T_p$ ($T_p = F_p \times r_p$) generated from the frictional force $F_p$ so that the set value of the torque $T_p$ becomes lower than the torque $T_g$ ($T_p < T_g$) acting due to the impact load can cause the pinion gear main body 12a that receives the impact load to run idle. In other words, the set value of the torque $T_2$ is the sliding starting preset load at which the clutch mechanism starts to slide, and if an excessive load larger than the starting preset load substantially equal to the maximum load during driving is input, the pinion main body 12a and the pinion shaft 12b with the tight-fitting structure slide and run idle, and thus, the excessive load input that acts on the engaging portion can be absorbed.

The tight-fitting is roughly classified into "loose-fitting" and "tight-fitting". In total, there are three types in design standards, including "intermediate-fitting" which is an intermediate state therebetween.

"Loose-fitting" is the most popular type, in which the outside diameter of the shaft is set smaller than the inside diameter of a fitted hole, and which is used for inserting a bearing, positioning parts, alignment, and so on.

In the "tight-fitting" employed in the foregoing embodiment, conversely, the shaft is larger than the hole; therefore, the shaft is inserted by press-fitting, shrinkage-fitting, cool-fitting, etc., and cannot be pulled out without force after insertion.

"Intermediate-fitting" can be either "loose-fitting" or "tight-fitting" depending on the processing states of the components to be fitted. The "intermediate-fitting" is used in inserting a key into a key hole, for example. Fitting specifications are generally made with reference to the hole, and the specified tolerance range of the hole is larger than that of the shaft. This is because the accuracy of holes is difficult to increase as compared with shafts because of the difference between the processing methods. Since how to select the tolerance ranges of holes and shafts is defined in the JIS standards, a necessary standard may be specified as needed.

Figure 5:
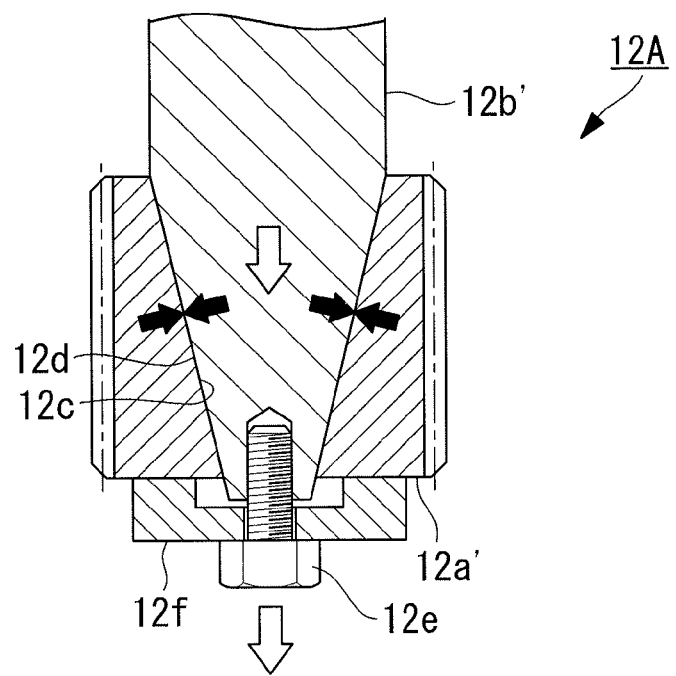
FIG. 5 is a sectional view of a first modification of the structure in which the drive gear of the slewing bearing (rolling bearing) shown in FIG. 4 is provided with a tight-fitting clutch mechanism.

The clutch mechanism of the foregoing tight-fitting structure may be the structure of a first modification shown in FIG. 5.

In this modification, a drive gear 12A employs a tapered surface as the joint between a pinion gear main body 12a' and a pinion shaft 12b' of the pinion gear. In other words, this is configured such that a shaft insertion hole 12c of the pinion gear main body 12a' and an inserted portion 12d of the pinion shaft 12b' are tapered surfaces serving as sliding surfaces, and the compressing force between the tapered surfaces is adjusted using the amount of tightening of an adjusting bolt 12e relative to the pinion shaft 12b'. Reference sign 12f in the drawing denotes a seating for applying a compressing force to the tapered surfaces and serves as a member for pushing the pinion gear main body 12a' upward by tightening the adjusting bolt 12e to increase the compressing force.

With the configuration of the first modification, the compressing force that acts on the tapered surfaces, which are joints (sliding surfaces) between the pinion gear main body 12a' and the pinion shaft 12b' of the pinion gear, can be adjusted in accordance with the amount of tightening of the adjusting bolt 12e, and accordingly, a frictional force that changes with the compressing force can also be adjusted. As a result, the sliding starting preset load of the clutch mechanism can be specified in accordance with the amount of tightening of the bolt 12e. In other words, a starting preset load substantially equal to the maximum load during driving can easily be set and adjusted in accordance with the amount of tightening of the adjusting bolt 12e.

Although the foregoing first and second embodiments have been described as applied to the slewing bearing equipped with the fixed gear 13 around the outer diameter, they may also be applied to a slewing bearing in which the fixed gear is provided around the inner diameter (inner circumferential surface).

Since the wind turbine generator 1 of this embodiment described above is equipped with the fixed gear 13 formed around the outer circumference or inner circumference, and the rolling bearing for use as a yaw slewing bearing and a blade slewing bearing is provided with the clutch mechanism, at the engaging portion, which slides when receiving an input larger than the maximum load during driving, as described above, an excessive impact load that acts on the gears of the engaging portion can be released by the operation of the clutch mechanism.

Accordingly, the specifications of the gears of the engaging portion of the rolling bearing for use as the yaw slewing bearing and the blade slewing bearing can be designed for the level of the maximum load during driving without reducing the necessary strength and durability. Accordingly, by reducing the sizes and weights of the gears of the engaging portion, the superstructure, such as the nacelle 3, mounted at the upper end of the tower 2 can be reduced in weight.

The present invention is not limited to the foregoing embodiments and can be modified as appropriate without departing from the spirit thereof.

REFERENCE SIGNS LIST 1 wind turbine generator
2 tower
3 nacelle
4 rotor head
5 wind turbine blades
10 yaw driving unit
12, 12A drive gear (pinion gear)
12a, 12a' pinion gear main body
12b, 12b' pinion shaft
12c shaft insertion hole
12d inserted portion
12e adjusting bolt
12f seating
13 fixed gear
14 yaw slewing bearing (rolling bearing)
16 pitch driving unit
17 blade slewing bearing (rolling bearing)
20, 20A, 20B slewing bearing
21 outer ring
211, 211A, 211B fixed-gear formed portion
212, 212A, 212B rolling-element contact portion
213 pad member

214 securing portion
215, 215A fixed pressing member
216 protruding portion
217 fixing bolt
22 inner ring
23 rolling elements
30, 30A pressing-force adjusting mechanism
31 bolt hole
32 adjusting bolt
33 elastic member
34 pressing member

The invention claimed is:

1. A wind turbine generator that generates electric power in such a manner that a rotor head that rotates when receiving wind power at wind turbine blades drives a generator installed inside a nacelle, the nacelle being installed at an upper end of a tower that is vertically erected on a foundation, the wind turbine generator comprising:

a yaw driving unit that yaws the nacelle and/or a pitch driving unit that controls pitch angles of the wind turbine blades, wherein a drive mechanism of the yaw driving unit and/or the pitch driving unit, which are equipped with an engaging portion of a slewing bearing having internal teeth or external teeth and a pinion gear, is equipped with a clutch mechanism, at the engaging portion, that slides when receiving an input larger than a maximum load during driving, the clutch mechanism is configured such that a joint between a pinion gear main body and a pinion shaft of the pinion gear has a tight-fitting structure, and a sliding starting preset load is specified, and the tight-fitting structure of the joint is configured such that a shaft insertion hole in the pinion gear main body and an inserted portion of the pinion shaft are tapered surfaces, and the sliding starting preset load is specified in accordance with a compressing force of the tapered surfaces, adjusted with a bolt tightening amount.

2. A wind turbine generator according to claim 1, wherein the clutch mechanism is configured such that a frictional force generated between contact surfaces that divide an inner ring or an outer ring serving as a fixed side of the slewing bearing in the radial direction is specified as a desired sliding starting preset load.

3. A wind turbine generator according to claim 2, further comprising a pressing-force adjusting mechanism that pushes horizontal surfaces and/or inclined surfaces provided on the contact surfaces in a vertical direction.

* * * * *